(12) United States Patent
Kim (10) Patent No.: US 8,589,959 B2
(45) Date of Patent: Nov. 19, 2013

(54) DISK DRIVE WITH ENHANCED LEAD SCREW

(75) Inventor: Hag-Ryeol Kim, Yongin-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/441,093

(22) Filed: Apr. 6, 2012

(65) Prior Publication Data

US 2012/0260270 A1    Oct. 11, 2012

(30) Foreign Application Priority Data

Apr. 8, 2011    (KR) .................. 10-2011-0032817

(51) Int. Cl.
*G11B 17/04*    (2006.01)
(52) U.S. Cl.
USPC ........................................... 720/610
(58) Field of Classification Search
USPC ......... 720/610, 613, 657, 607, 611, 612, 650, 720/608
See application file for complete search history.

(56) References Cited

U.S. PATENT DOCUMENTS

| 5,844,873 | A * | 12/1998 | Aoyama et al. ............... 720/676 |
| 7,123,438 | B2 * | 10/2006 | Seo ............................... 360/99.2 |
| 2006/0161931 | A1 * | 7/2006 | Chen et al. .................... 720/610 |
| 2007/0028250 | A1 * | 2/2007 | Chien et al. ................... 720/610 |
| 2010/0262980 | A1 * | 10/2010 | Matsumoto et al. .......... 720/610 |
| 2012/0174133 | A1 * | 7/2012 | Kim et al. ..................... 720/610 |
| 2012/0174134 | A1 * | 7/2012 | Kim et al. ..................... 720/610 |
| 2012/0260270 | A1 * | 10/2012 | Kim .............................. 720/610 |
| 2012/0260271 | A1 * | 10/2012 | Kim .............................. 720/613 |

FOREIGN PATENT DOCUMENTS

KR    10-0288926 B1    5/2001

OTHER PUBLICATIONS

Korean Office Action issued Oct. 25, 2012 in counterpart Korean Patent Application No. 10-2011-0032817 (4 pages, in Korean).

* cited by examiner

*Primary Examiner* — Allen T Cao
(74) *Attorney, Agent, or Firm* — NSIP Law (57) ABSTRACT

Provided is a disc drive including a main chassis, and a tray, which may receive a disc thereon, and is arranged to slide into and out of the main chassis. The tray includes a pickup transporting unit which linearly moves a pickup base in a radial direction of the disc and includes a step motor and a lead screw. The lead screw includes a plurality of sections with different diameters.

16 Claims, 6 Drawing Sheets

DISK DRIVE WITH ENHANCED LEAD SCREW

CROSS-REFERENCE TO RELATED PATENT APPLICATION(S)

This application claims the benefit under 35 USC §119(a) of Korean Patent Application No. 10-2011-0032817, filed on Apr. 08, 2011, in the Korean Intellectual Property Office, the entire disclosure of which is incorporated herein by reference for all purposes.

BACKGROUND

1. Field

The following description relates to a disk drive, and more particularly, to a disk drive having an enhanced lead screw for smoothly moving a feed guide of an optical pickup unit.

2. Description of the Related Art

A disc drive is a device for writing and reading data to and from an optical recording medium, for example, a compact disc (CD), a digital video disc (DVD), and the like, by irradiating light thereto.

A disc drive typically includes a main chassis, a tray for receiving a disc thereon and which slides into and out of the main chassis, a cover which forms the outer case of the disc drive and protects internal components and electronic devices thereof, a spindle motor for rotating a disc loaded on the tray, an optical pickup unit for reproducing/writing data from and to a disc, and a pickup transporting unit which moves an optical pickup base mounted thereon along a radial direction of a disc.

The disc drive also typically includes a locking unit for locking the tray into the main chassis and a lock release unit for releasing the tray from the main chassis.

In the related art, a lock release unit releases locking of a tray from a main chassis using a solenoid. However, because the solenoid is separately installed from the lock release unit, an additional space is required, and thus, the manufacturing costs increase.

Furthermore, a feed guide for connecting the optical pickup unit to a lead screw is not combined with the lead screw. Accordingly, the optical pickup unit may not be smoothly moved by the lead screw.

SUMMARY

In one general aspect, there is provided a disc drive including a main chassis, and a tray which receives a disc thereon, is arranged to slide into and out of the main chassis, and comprises a pickup transporting unit, wherein the pickup transporting unit linearly moves a pickup base in a radial direction of the disc and comprises a step motor, and a lead screw which is connected to the step motor, rotates, and comprises a plurality of sections with different diameters.

The lead screw may comprise a diameter changing point at which the diameter of the lead screw changes, a first section from the step motor to the diameter changing point, and a second section from the diameter changing point to a first end of the lead screw, wherein the diameter of the first section is greater than that of the second section.

The disc drive may further comprise a lock release unit which is arranged at the tray and is driven by the pickup transporting unit to release locking of the tray from the main chassis, wherein, in response to a feed guide connecting the pickup base to the lead screw reaching the diameter changing point, locking of the lock release unit is interrupted.

The lock release unit may comprise a lock lever unit which is rotatably installed on the tray and is combined with a locking protrusion arranged at the main chassis, a link unit which is rotatably installed on the tray and comprises a power transmitting unit which is combined with the pickup transporting unit and which receives a rotational force, and a connecting unit which is rotatably installed on the tray, is connected to the lock lever unit and the link unit, and rotates the lock lever unit using a rotational force of the link unit.

The link unit may further comprise an interrupter which moves and collides with the feed guide connecting the pickup base to the pickup transporting unit, and in response to the link unit rotating as the interrupter collides with the feed guide, the power transmitting unit is combined with the pickup transporting unit.

The power transmitting unit may be formed of a protrusion having a predetermined height that is to be combined with the lead screw of the pickup transporting unit.

The disc drive may further comprise a pickup base position limiting unit which limits a position of the pickup base in response to the power transmitting unit being combined with the lead screw.

The interrupter may collide with the feed guide at the diameter changing point.

In another aspect, there is provided a disc drive including a main chassis, a tray which receives a disc thereon, is arranged to slide into and out of the main chassis, and comprises a pickup transporting unit, and a lock release unit which is arranged at the tray and is driven by the pickup transporting unit to release locking of the tray from the main chassis, wherein the pickup transporting unit linearly moves a pickup base in a radial direction of the disc and comprises a step motor, and a lead screw which is connected to the step motor, rotates, and comprises a plurality of sections with different diameters.

The lead screw may comprise a diameter changing point at which the diameter of the lead screw changes, a first section from the step motor to the diameter changing point, and a second section from the diameter changing point to a first end of the lead screw, wherein the diameter of the first section is greater than that of the second section.

The lock release unit may comprise a lock lever unit which is rotatably installed on the tray and is combined with a locking protrusion arranged at the main chassis, a link unit which is rotatably installed on the tray and comprises a power transmitting unit which is combined with the pickup transporting unit and which receives rotational force, and a connecting unit which is rotatably installed on the tray, is connected to the lock lever unit and the link unit, and rotates the lock lever unit using rotational force of the link unit.

The link unit may further comprise an interrupter which moves and collides with a feed guide connecting the pickup base to the pickup transporting unit, and in response to the link unit rotating as the interrupter collides with the feed guide, the power transmitting unit is combined with the pickup transporting unit.

In response to the feed guide connecting the pickup base to the lead screw reaching the diameter changing point, locking of the lock release unit may be interrupted.

The interrupter may collide with the feed guide at the diameter changing point.

The power transmitting unit may be formed of a protrusion having a predetermined height that is to be combined with the lead screw of the pickup transporting unit.

The disc drive may further comprise a pickup base position limiting unit which limits a position of the pickup base in response to the power transmitting unit being combined with the lead screw.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
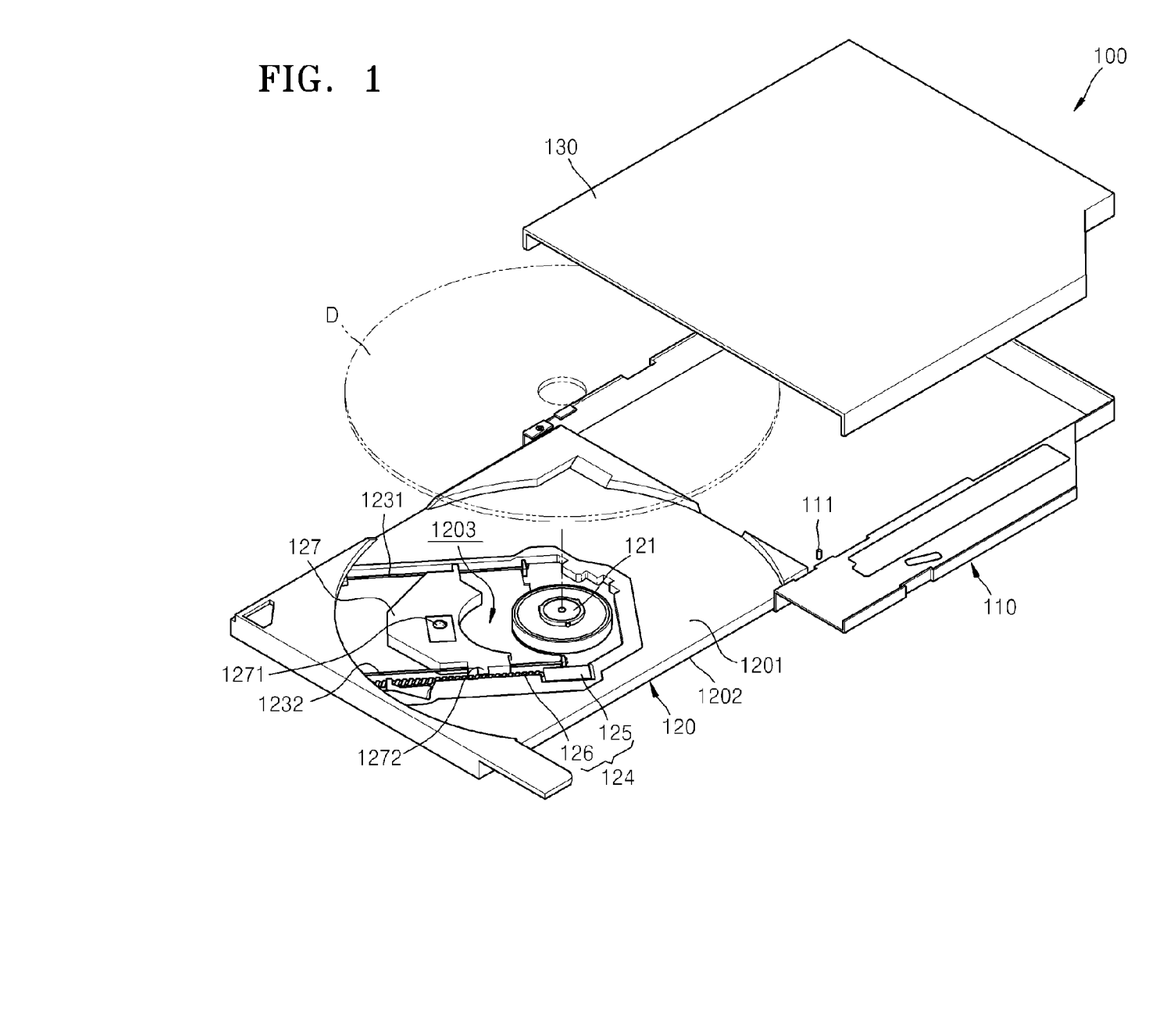
FIG. 1 is a diagram illustrating an example of a disc drive including a lock release unit.
Figure 2:
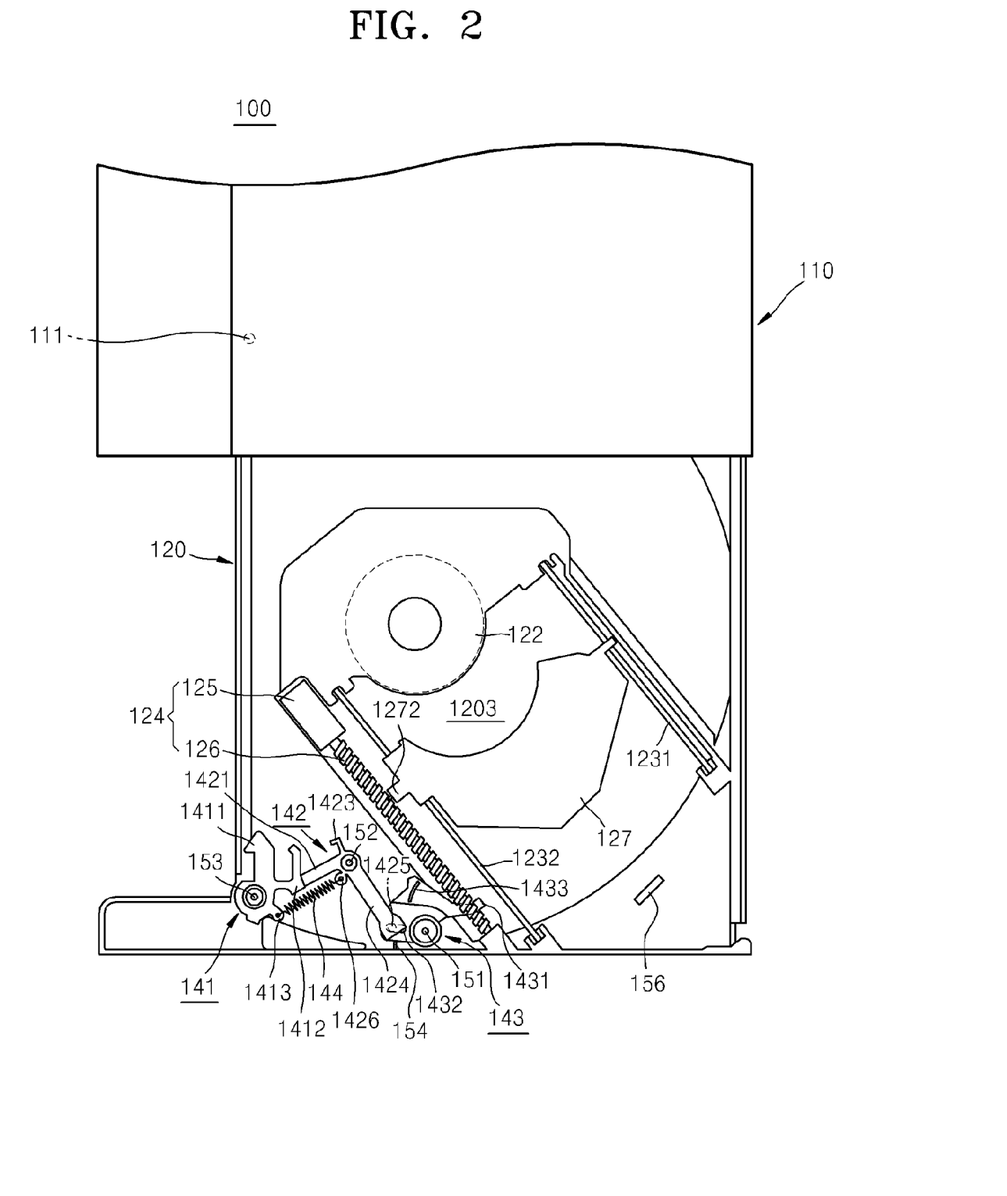
FIG. 2 is a diagram illustrating an example of a rear perspective view of the disc drive shown in FIG. 1.
Figure 3:
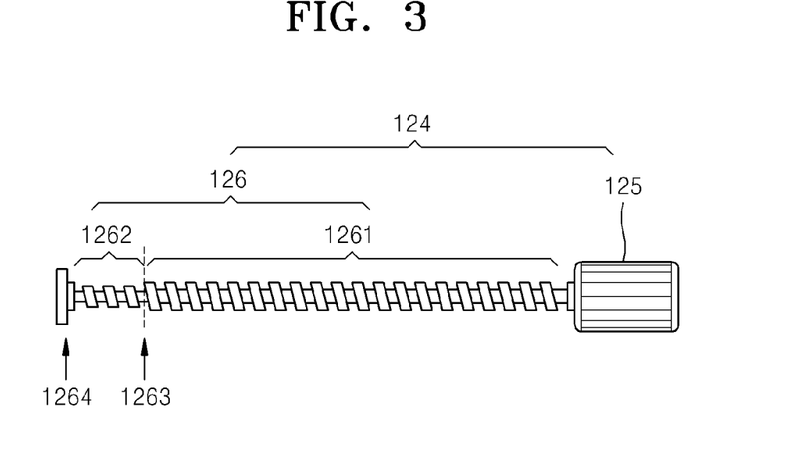
FIG. 3 is a diagram illustrating an example of a lead screw shown in FIG. 2.
Figure 4:
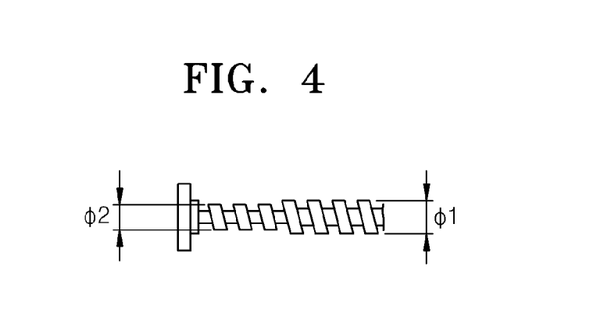
FIG. 4 is an example of a magnified perspective view of a portion of the lead screw shown in FIG. 3.
Figure 5:
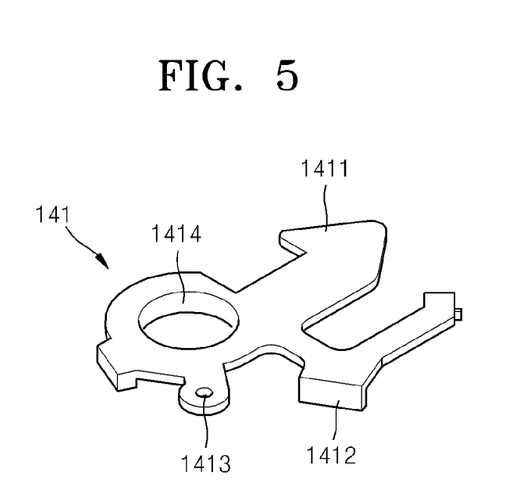
FIG. 5 is a diagram illustrating an example of a lock lever unit of the lock release unit shown in FIG. 2.
Figure 6:
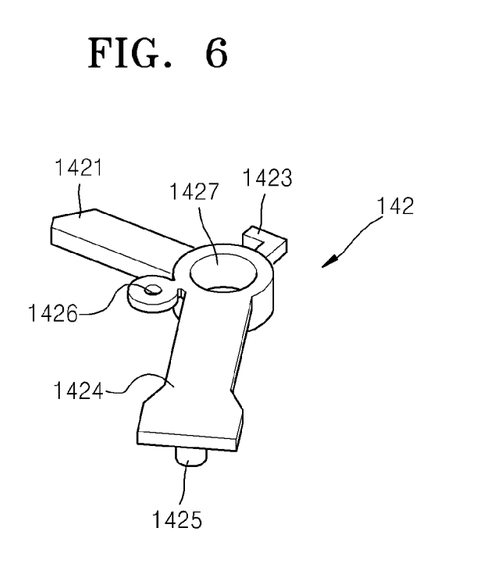
FIG. 6 is a diagram illustrating an example of a connecting unit shown in FIG. 2.
Figure 7:
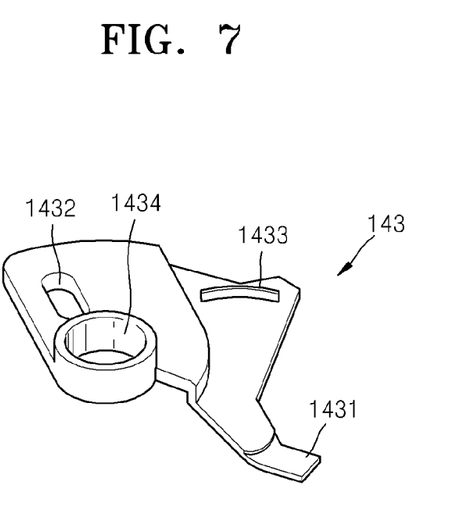
FIG. 7 is a diagram illustrating an example of a link unit shown in FIG. 2.

FIG. 1 illustrates an example of a disc drive 100 including a lock release unit. FIG. 2 illustrates an example of a rear perspective view of the disc drive 100 shown in FIG. 1. FIG. 3 illustrates an example of a lead screw shown in FIG. 2. FIG. 4 illustrates an example of a magnified perspective view of a portion of the lead screw shown in FIG. 3. FIG. 5 illustrates an example of a lock lever unit of the lock release unit shown in FIG. 2. FIG. 6 illustrates an example of a connecting unit shown in FIG. 2, and FIG. 7 illustrates an example of a link unit shown in FIG. 2.

Referring to FIGS. 1 through 4, the disc drive 100 includes a main chassis 110, a cover 130 which covers the main chassis 110 such that a predetermined space is formed between the cover 130 and the main chassis 110, and a tray 120 which may receive a disc D thereon and which is slidably installed to the main chassis 110 to slide into and out of the main chassis 110.

A turntable 121 on which the disc D may be mounted, a driving motor 122 for rotating the turntable 121, and a pickup base 127 are installed at the tray 120. The pickup base includes an optical pickup unit 1271 which may write data and read data to and from the disc D by irradiating light onto the disc D.

In this example, the optical pickup unit 1271 is installed at a pickup base 127, and the pickup base 127 is attached to two guide shafts 1231 and 1232 which guide the pickup base 127 to linearly move in a radial direction along the disc D. A lead screw 126 for linearly moving the pickup base 127 in a radial direction of the disc D and a step motor 125 for rotating the lead screw 126 are arranged as a pickup transporting unit 124. Further, a feed guide 1272 for transmitting a rotational force of the lead screw 126 to the pickup base 127 is installed at the pickup base 127. A space portion 1203 in which the pickup base 127 linearly reciprocates is formed near a center portion of a body of the tray 120.

As shown in FIGS. 3 and 4, the lead screw 126 includes two sections with different diameters around a diameter changing point 1263. A first section 1261 of the screw is from the step motor 125 to the diameter changing point 1263, and a second section 1262 is from the diameter changing point 1263 to a first end 1264. For example, the lead screw 126 may include two sections with different diameters as further described herein in relation to the lock release unit 140. As another example, the lead screw 126 may include more than two sections with more than two diameters.

A lock release unit releases locking of the tray 120 inserted and locked into the main chassis 110. The lock release unit includes a lock lever unit 141, a connecting unit 142, and a link unit 143, which are installed on a rear surface 1202 a body 1201 of the tray 120. The lock release unit is arranged close to the lead screw 126 and is interlocked with the lead screw 126 to release lock of the tray 120.

Referring to FIG. 5, the lock lever unit 141 unit may lock or release the tray 120 to or from the main chassis 110. The lock lever unit 141 includes a supporting hole 1414 which penetrates the body, a hook unit 1411 which may be combined with a locking protrusion 111 formed on the rear surface of the main chassis 110, a rotational force receiving unit 1412 which may receive a rotational force by contacting the connecting unit 142, and a spring fixing unit 1413 to which a first end of a spring 144 may be fixed. A rotation shaft 153 is arranged on the rear surface 1202 of the tray and may be inserted in the supporting hole 1414 for rotating the lock lever unit 141.

The link unit 143 is a unit via to which a rotational force may be transmitted. The link unit 143 includes a hole 1434 into which the rotation shaft 151 arranged on the rear surface 1202 of the tray 120 may be inserted for rotating the lock lever unit 141, a connecting hole 1432 for connecting the connecting unit 142 to the link unit 143, a power transmitting unit 1433 which is a protrusion that is formed to a predetermined height to be selectively combined with the lead screw 126, and an interrupter 1431 which extends a predetermined length to selectively collide with the feed guide 1272. The power transmitting unit 1433 and the interrupter 1431 face the lead screw 126.

Referring to FIG. 6, the connecting unit 142 may rotate by receiving a rotational force of the link unit 143 and may rotate the lock lever unit 141. The connecting unit 142 includes a hole 1427 into which a rotation shaft 152 arranged on the rear surface 1202 of the tray 120 may be inserted for rotating the connecting unit 142, a first connecting unit 1424 which includes a connecting protrusion 1425 that may be inserted to the connecting hole 1432 of the link unit 143, a second connecting unit 1421 which is connected to the rotational force receiving unit 1414 (shown in FIG. 5) of the lock lever unit 141, a spring fixing unit 1426 to which a second end of the spring 144 is fixed, and a position limiting unit 1423 for limiting the initial position of the lock release unit 140.

A stopper 154 is arranged close to the link unit 143 to limit an initial position of the lock release unit 140, and is arranged on the rear surface 1202 of the tray 120. As shown in FIG. 2, when the tray 120 is moved out of the main chassis 110, the lock release unit 140 is at the initial position at which the tray 120 is released from the main chassis 110. In this example, the link unit 143 contacts the stopper 154, and the position limiting unit 1423 of the connecting unit 142 contacts a frame 155 (shown in FIG. 8) of the tray 120. Therefore, the initial position of the lock release unit 140 is limited by the stopper 154 and the position limiting unit 1423.

A pickup base position limiting unit 156 which limits the initial position of the tray 120 is arranged on the rear surface 1202 of the tray 120. For example, the outward movement of the pickup base 127 may be limited by the pickup base position limiting unit 156.

An elastic force may be applied to the lock lever unit 141 by the spring 144 in a direction in which the hook unit 1411 is combined with the locking protrusion 111.

Figure 8:
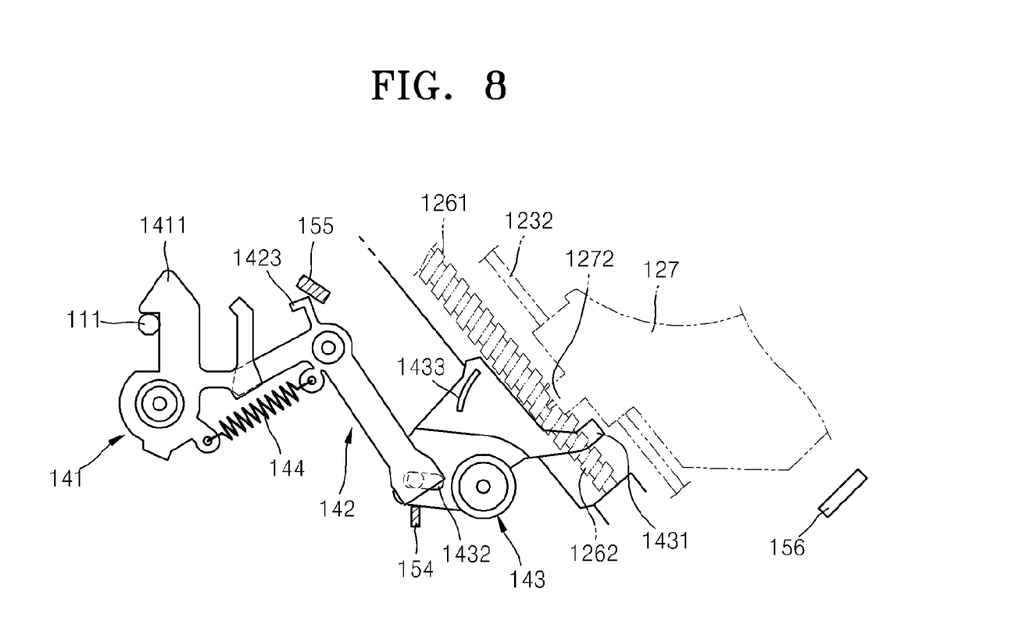
FIGS. 8 through 10 are diagrams illustrating examples of a series of operations of the lock release unit shown in FIG. 2.
Figure 9:
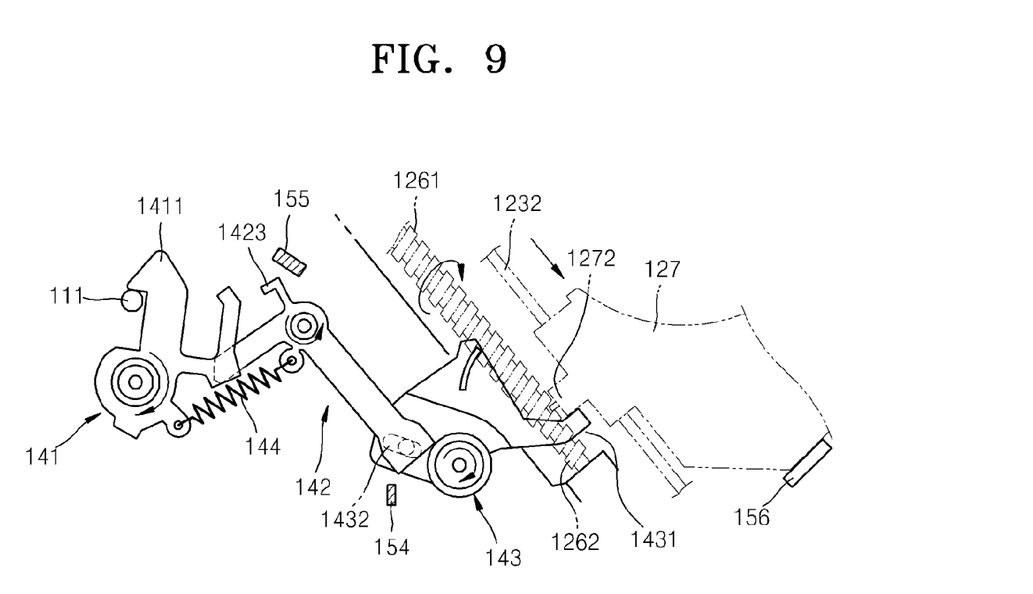
Figure 10:
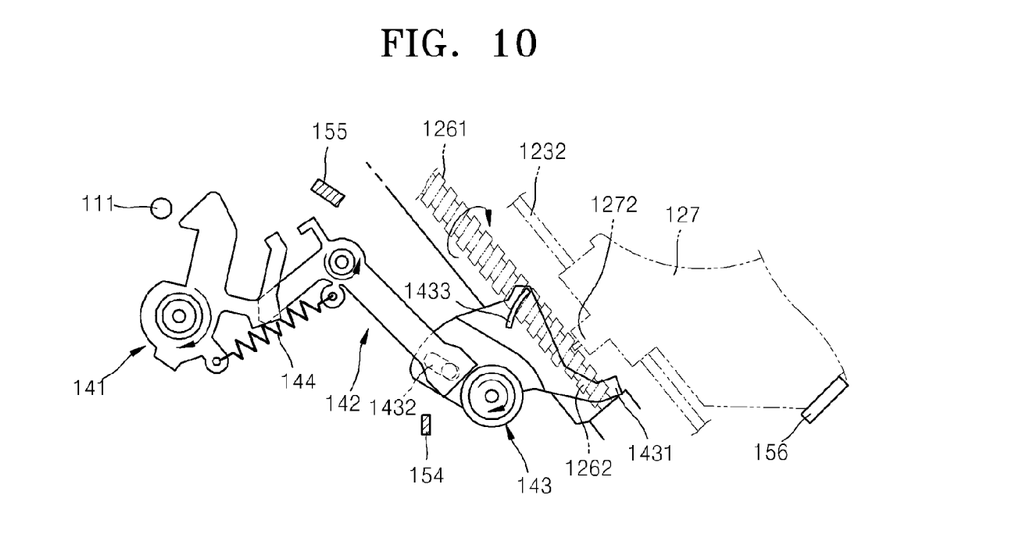

FIGS. 8 through 10 illustrate examples of a series of operations of the lock release unit shown in FIG. 2.

Referring to FIG. 8, the tray (120 of FIG. 2) is inserted to the main chassis (110 of FIG. 2) and the hook unit 1411 is combined with the locking protrusion 111. This state corresponds to the initial state of the lock release unit 140. Therefore, the link unit 143 is contacting the stopper 154, the position limiting unit 1423 contacts the frame 155, and the spring 144 applies an elastic force to the lock lever unit 141 in a counterclockwise direction. In this example, the lock lever unit 141 is prevented from being rotated in the clockwise direction, and thus, the hook unit 1411 may be maintained in a combined state with the locking protrusion 111. As a result, the tray (120 of FIG. 2) may be securely maintained within the main chassis (110 of FIG. 2).

Here, the power transmitting unit 1433 does not contact the lead screw 126, and the interrupter 1431 does not contact the feed guide 1272 of the pickup base 127. The feed guide 1272 is located at the first section 1261 of the lead screw 126. The pickup base 127 may receive a rotational force of the lead screw 126 from the feed guide 1272 and may read out data that is recorded on a disc or write data to the disc while linearly moving in a radial direction of the disc, when the feed guide is located in the first section 1261 of the lead screw 126. It should be appreciated that a position of the pickup base 127 may vary and is not limited to the position shown in FIG. 4. In this example, while the optical pickup unit (1271 of FIG. 1) is writing data or reading out data, the feed guide 1272 of the pickup base 127 does not contact the interrupter 1431. In other words, even if the optical pickup unit 1271 is positioned at the outermost position of a disc, the feed guide 1272 of the pickup base 127 may not contact the interrupter 1431.

Referring to FIG. 9, if a lock release signal is input, a control unit (not shown) drives the step motor (125 of FIG. 2) to rotate the lead screw 126 in the clockwise direction. As a result, the pickup base 127 is moved by the lead screw 126 in the direction indicated by the arrow. As the feed guide 1272 contacts the interrupter 1431, the link unit 143 rotates in the clockwise direction, and thus, the connecting unit 142 connected to the link unit 143 rotates in the counterclockwise direction and the lock lever unit 141 connected to the connecting unit 142 rotates in the clockwise direction. As a result, the link unit 143 may be detached from the stopper 154, and the position limiting unit 1423 may be detached from the frame 155. Furthermore, as the link unit 143 rotates, the power transmitting unit 1433 may be combined with the first section 1261 of the lead screw 126. Further, the pickup base 127 may collide with the pickup base position limiting unit 156 formed on the rear surface 1202 of the tray (120 of FIG. 1) and a movement thereof is limited. In other words, when the pickup base 127 collides with the pickup base position limiting unit 156 and becomes unable to move further, the power transmitting unit 1433 may be combined with the first section 1261 of the lead screw 126.

Rotation of the link unit 143 due to the movement of the pickup base 127 before the pickup base 127 collides with the pickup base position limiting unit 156 may be insufficient for detaching the hook unit 1411 from the locking protrusion 111. Therefore, the hook unit 1411 is maintained in combination with the locking protrusion 111. In other words, until the pickup base 127 collides with the pickup base position limiting unit 156, the movement of the pickup base 127 serves to combine the power transmitting unit 1433 to the first section 1261 of the lead screw 126 and does not serve to detach the hook unit 1411 from the locking protrusion 111. In this state, if an external shock is applied to the disc drive (100 of FIGS. 1 and 2), even if the pickup base 127 is arbitrarily moved, the pickup base 127 is limited from being further moved from the state shown in FIG. 4. Accordingly, even if an arbitrary external shock is applied to the disc drive 100, locking of the tray (120 of FIG. 1) may not be released from the main chassis (110 of FIGS. 1 and 2).

Referring to FIG. 10, if the power transmitting unit 1433 is combined with the first section 1261 of the lead screw 126, the step motor (125 of FIG. 2) rotates further in the clockwise direction. At this point, because the pickup base 127 contacts the pickup base position limiting unit 156, a further movement of the pickup base 127 is limited. Furthermore, the feed guide 1272 may be unable to move and may be stopped due to the lead screw 126. Therefore, as the link unit 143 rotates in the clockwise direction, the interrupter 1431 may be detached from the feed guide 1272.

A characteristic of the following description is the diameter changing point 1263 at which the diameter of the lead screw 126 changes. When the feed guide 1272 reaches the diameter changing point 1263, the feed guide 1272 may be unable to move linearly due to the position limiting unit 156 and spins freely. The diameter of the first section 1261 of the lead screw 126 is smaller than that of the second section 1262 of the lead screw 1262, and thus, the feed guide 1272 may smoothly freely spin at the first section 1261 of the lead screw 126. Conversely, if the diameter of the first section 1261 of the lead screw 126 is the same as that of the second section 1262 of the lead screw 126, rotation of the feed guide 1272 due to combination of the power transmitting unit 1433 with the first section 1261 of the lead screw 126 may not be smooth. Therefore, because the feed guide 1272 is combined with the first section 1261 of the lead screw 126 and spins freely, the rotation of the feed guide 1271 is not interrupted by the combination of the power transmitting unit 1433 with the first section 1261 of the lead screw 126.

Because rotation of the link unit 143 is transmitted to the lock lever unit 141 via the connecting unit 142, the hook unit 1411 is detached from the locking protrusion 111. At this point, the spring 144 is extended to the maximum. Therefore, the tray 120 protrudes from the main chassis 110 (refer to FIG. 1).

Figure 11:
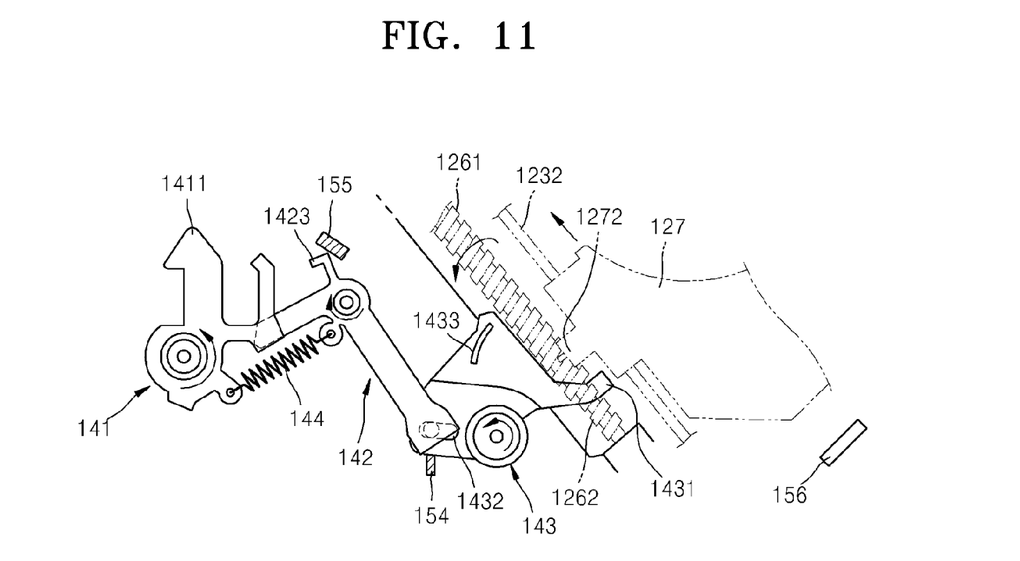
FIG. 11 is a diagram illustrating an example of a return of the lock release unit to an initial position.

FIG. 11 illustrates an example of a return of the lock release unit to the initial position.

FIG. 11 shows that the lock release unit 140 is returned to the initial position, such that the hook unit 1411 is combined with the locking protrusion (111 of FIG. 1) when the tray (120 of FIG. 1) is inserted back to the main chassis (110 of FIG. 1).

The control unit may reversely rotate the step motor (125 of FIG. 2) in the counterclockwise direction. As a result, the lead screw 126 also reverse-rotates, and the power transmitting unit 1433 is detached from the first section 1261 of the lead screw 126. Furthermore, because extending force of the spring 144 is also applied, the link unit 143 rotates in the counterclockwise direction, the connecting unit 142 connected to the link unit 143 rotates in the clockwise direction, and the lock lever unit 141 connected to the connecting unit 142 rotates in the counterclockwise direction. Furthermore, the position limiting unit 1423 contacts the frame 155, and the link unit 143 contacts the stopper 154. This state corresponds to the initial position of the lock release unit 140 shown in FIG. 6.

On the other hand, as rotational force of the lead screw 126 is transmitted to the pickup base 127 via the feed guide 1272, the pickup base 127 is moved in the direction indicated by the arrow and may be detached from the pickup base position limiting unit 156. At this point, the feed guide 1271 may be moved from the second section 1262 of the lead screw 126 to the first section 1261 of the lead screw 126.

In a disc drive described herein, a lead screw includes two sections with different diameters. Therefore, if a feed guide is combined with the lead screw, an operation of a lock release unit is not interrupted, and thus, the lock release unit may operate smoothly.

While the description has been particularly shown and described with reference to examples thereof, it will be understood by those of ordinary skill in the art that various changes in form and details may be made therein without departing from the spirit and scope of the description as defined by the following claims.

A disc as described herein may include one or more program instructions, or one or more operations thereof, which may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A disc drive comprising:
    a main chassis; and
    a tray which receives a disc thereon, is arranged to slide into and out of the main chassis, and comprises a pickup transporting unit, wherein
    the pickup transporting unit linearly moves a pickup base in a radial direction of the disc using a feed guide and comprises:
        a step motor; and
        a lead screw which is connected to the step motor, rotates, and comprises a plurality of sections with different diameters; and
    in response to the feed guide reaching a diameter changing point at which a diameter of the lead screw changes, locking of the tray is interrupted.

2. The disc drive of claim 1, wherein the lead screw comprises:
    a first section from the step motor to the diameter changing point, and
    a second section from the diameter changing point to a first end of the lead screw,
    wherein the diameter of the first section is greater than that of the second section.

3. The disc drive of claim 2, further comprising a lock release unit which is arranged at the tray and is driven by the pickup transporting unit to release locking of the tray from the main chassis,
    wherein, in response to the feed guide connecting the pickup base to the lead screw reaching the diameter changing point, locking of the lock release unit is interrupted.

4. The disc drive of claim 3, wherein the lock release unit comprises:
    a lock lever unit which is rotatably installed on the tray and is combined with a locking protrusion arranged at the main chassis;
    a link unit which is rotatably installed on the tray and comprises a power transmitting unit which is combined with the pickup transporting unit and which receives a rotational force; and
    a connecting unit which is rotatably installed on the tray, is connected to the lock lever unit and the link unit, and rotates the lock lever unit using a rotational force of the link unit.

5. The disc drive of claim 4, wherein the link unit further comprises an interrupter which moves and collides with the feed guide connecting the pickup base to the pickup transporting unit, and
    in response to the link unit rotating as the interrupter collides with the feed guide, the power transmitting unit is combined with the pickup transporting unit.

6. The disc drive of claim 5, wherein the power transmitting unit is formed of a protrusion having a predetermined height that is to be combined with the lead screw of the pickup transporting unit.

7. The disc drive of claim 6, further comprising a pickup base position limiting unit which limits a position of the pickup base in response to the power transmitting unit being combined with the lead screw.

8. The disc drive of claim 5, wherein the interrupter collides with the feed guide at the diameter changing point.

9. A disc drive comprising:
a main chassis;
a tray which receives a disc thereon, is arranged to slide into and out of the main chassis, and comprises a pickup transporting unit; and
a lock release unit which is arranged at the tray and is driven by the pickup transporting unit to release locking of the tray from the main chassis, wherein
the pickup transporting unit linearly moves a pickup base in a radial direction of the disc using a feed guide and comprises:
a step motor; and
a lead screw which is connected to the step motor, rotates, and comprises a plurality of sections with different diameters; and
in response to the feed guide reaching a diameter changing point at which a diameter of the lead screw changes, locking of the tray is interrupted.

10. The disc drive of claim 9, wherein the lead screw comprises:
a first section from the step motor to the diameter changing point, and
a second section from the diameter changing point to a first end of the lead screw,
wherein the diameter of the first section is greater than that of the second section.

11. The disc drive of claim 10, wherein the lock release unit comprises:
a lock lever unit which is rotatably installed on the tray and is combined with a locking protrusion arranged at the main chassis;
a link unit which is rotatably installed on the tray and comprises a power transmitting unit which is combined with the pickup transporting unit and which receives rotational force; and
a connecting unit which is rotatably installed on the tray, is connected to the lock lever unit and the link unit, and rotates the lock lever unit using rotational force of the link unit.

12. The disc drive of claim 11, wherein the link unit further comprises an interrupter which moves and collides with the feed guide connecting the pickup base to the pickup transporting unit, and
in response to the link unit rotating as the interrupter collides with the feed guide, the power transmitting unit is combined with the pickup transporting unit.

13. The disc drive of claim 12, wherein, in response to the feed guide connecting the pickup base to the lead screw reaching the diameter changing point, locking of the lock release unit is interrupted.

14. The disc drive of claim 13, wherein the interrupter collides with the feed guide at the diameter changing point.

15. The disc drive of claim 12, wherein the power transmitting unit is formed of a protrusion having a predetermined height that is to be combined with the lead screw of the pickup transporting unit.

16. The disc drive of claim 15, further comprising a pickup base position limiting unit which limits a position of the pickup base in response to the power transmitting unit being combined with the lead screw.

* * * * *